US00RE41168E

(19) United States
(12) Reissued Patent
Shannon

(10) Patent Number: US RE41,168 E
(45) Date of Reissued Patent: Mar. 23, 2010

(54) CONTROLLING CLIENT ACCESS TO NETWORKED DATA BASED ON CONTENT SUBJECT MATTER CATEGORIZATION

(75) Inventor: Steven Shannon, Chelmsford, MA (US)

(73) Assignee: Content Advisor, Inc., Chelmsford, MA (US)

(21) Appl. No.: 10/965,710

(22) Filed: Oct. 14, 2004

Related U.S. Patent Documents

Reissue of:
(64) Patent No.: 6,233,618
Issued: May 15, 2001
Appl. No.: 09/052,236
Filed: Mar. 31, 1998

(51) Int. Cl.
*G06F 15/16* (2006.01)

(52) U.S. Cl. ..... 709/229; 709/225; 709/229; 707/10

(58) Field of Classification Search ..... 707/10; 709/225, 229
See application file for complete search history.

(56) References Cited

U.S. PATENT DOCUMENTS

| | | | |
|---|---|---|---|
| 5,678,041 | A | 10/1997 | Baker et al. |
| 5,696,898 | A | 12/1997 | Baker et al. |
| 5,706,507 | A | 1/1998 | Schloss |
| 5,708,780 | A | 1/1998 | Levergood et al. |
| 5,710,883 | A | 1/1998 | Hong et al. |
| 5,835,712 | A | 11/1998 | DuFresne |
| 5,889,958 | A | 3/1999 | Willens |
| 5,933,600 | A | 8/1999 | Shieh et al. |
| 5,933,827 | A | 8/1999 | Cole et al. |
| 5,941,947 | A | 8/1999 | Brown et al. |
| 5,950,195 | A | 9/1999 | Stockwell et al. |
| 5,953,732 | A | 9/1999 | Meske, Jr. et al. |
| 5,983,176 | A | 11/1999 | Hoffert et al. |
| 5,991,810 | A | 11/1999 | Shapiro et al. |
| 6,078,924 | A | 6/2000 | Ainsbury et al. |
| 6,088,717 | A | 7/2000 | Reed et al. |
| 6,154,775 | A | 11/2000 | Coss et al. |

OTHER PUBLICATIONS

Faircloth, L., "Faircloth: No computer games on government time!", *Lauch Faircloth News Release*, Jun. 4, 1997.
Faircloth, L., "Senate and Faircloth Pull The Plug On Computer Games," *Lauch Faircloth News Release*, Jul. 17, 1997.
"Administering decency," *Infoworld, The Voice of Enterprise Computing*, 19:58–60, 62, 64, 66, 68 ( Aug. 25, 1997).

(Continued)

*Primary Examiner*—Robert B Harrell
(74) *Attorney, Agent, or Firm*—Hamilton Brook Smith & Reynolds, P.C.

(57) ABSTRACT

An access control technique to limit access to information content such as available on the Internet. The technique is implemented within a network device such as a proxy server, router, switch, firewall, bridge or other network gateway. The access control process analyzes data in each request from the clients and determines if the request should be forwarded for processing by a server to which it is destined. Access control may be determined by comparing client source information against a database of Uniform Resource Locators (URLs), IP addresses, or other resource identification data specifying the data requested by the client. The invention therefore provides access control not based only upon content, but rather, based primarily upon the identity of the computers or users making the requests. The technique further avoids the problems of the prior art which categories or filters the content of only web pages based solely upon objectionable words. This is because a category database is used by the network device to control access and is created via a process involving human editors who assist in the creation and maintenance of the category database.

34 Claims, 4 Drawing Sheets

OTHER PUBLICATIONS

"Cyber Patrol," *Infoworld, The Voice of Enterprise Computing*, 19:100 (Sep. 22, 1997).

"The Whistle InterJet," *Whistle Communications—The InterJet*, http://www.whistle.com/products/prodindexb.html (Feb 20, 1998 8:58AM).

"Surf–Watch," *Surfwatch Home Page*, http://wwwl.surfwatch.com/home/(Feb. 20, 1998 9:01AM).

NetPartners, "Advanced Internet Screening System: A Functional Overview," *WebSense*, www.netpartners.com (Nov. 1997).

Murphy, K., "U.S. Weighs Pulling Plug On Internet Gambling," *Webweek*, pp. 1–2 (no date).

Surf Control, "Scout Family Getting Started Guide," http://www.surfcontrol.com/support/PDF document, No date.

$N_2H_2$ The Leader in Internet Filters™, "N2H2 is committed to making the Internet a more accessible and valuable resource or schools, businesses and families," http://web.archive.org/web/19961111191033://n2h2.com/, 1996.

InterGate™ Internet Server, http://web.archive.org/web/19970327223659/www.ipinc.com/intergate.intergate.html, No date.

NetPartners, "Block Undesirable Websites with WebSENSE," http://www.netpart.com/websense, No date.

Baker, B.S. and Grosse, E. "Local Control Over Filtered WWW Access," *World Wide Web Journal*; 423–432, No date.

Salamonsen, W. B., et al., "PICS–Aware Proxy System Versus Proxy Server Filters," mhtml:file://C:\WINDOWS\TEMP\PICE–Aware%20Proxy%20System%20Versus%20Pr... (Dec. 23, 2002).

Resnick, P. And Miller, J., "PICS: Internet Access Controls Without Censorship," mhtml:file://C:\WINDOWS\TEMP\PICS%20Internet%20Access%20Control%20Witho...(Dec. 23, 2002).

Resnick, P., "Filtering Information on the Internet," *Scientific American*:62–64 (Mar. 1997).

Secure Computing, "SmartFilter™ Web Tool," No date.

Peacefire, "Blocking Software FAQ," http://www.peacefire.org/info/blocking–software–faq.html, (Oct. 7, 2003).

Peacefire, "SmartFilter Examined," http://www.peacefire.org.censorware/SmartFilter/, (Oct. 7, 2003).

Burt, D., "The Facts on Filters, A Comprehensive Review of 26 Independent Laboratory Tests of the Effectiveness of Internet Filtering Software," N2H2:1–19, No date.

Cragle, J., "CYBERsitter97," http://www.winnetmag.com/Articles/Print.cfm?ArticleID=164, (Oct. 7, 2003).

Nordbrock, B., "LIS415 Filtering Software Comparison," http://216.239.39.104/search?q=cache:v3QTDHH6vPwJ:alexia.lis.uiuc.edu/course/fall19... (Oct. 7, 2003).

Field, T., "Webcops," *CIO Magazine*, http://www.cio.com/archive/111597/cops.html, (Jul. 1, 2003).

Mallery, J. C., et al., "A Constraint–Guided Web Walker for Specialized Activities," http://www.ai.mit.edu/projects/iiip/doc/cl–http/w4/w4.html. (Jul. 8, 2003).

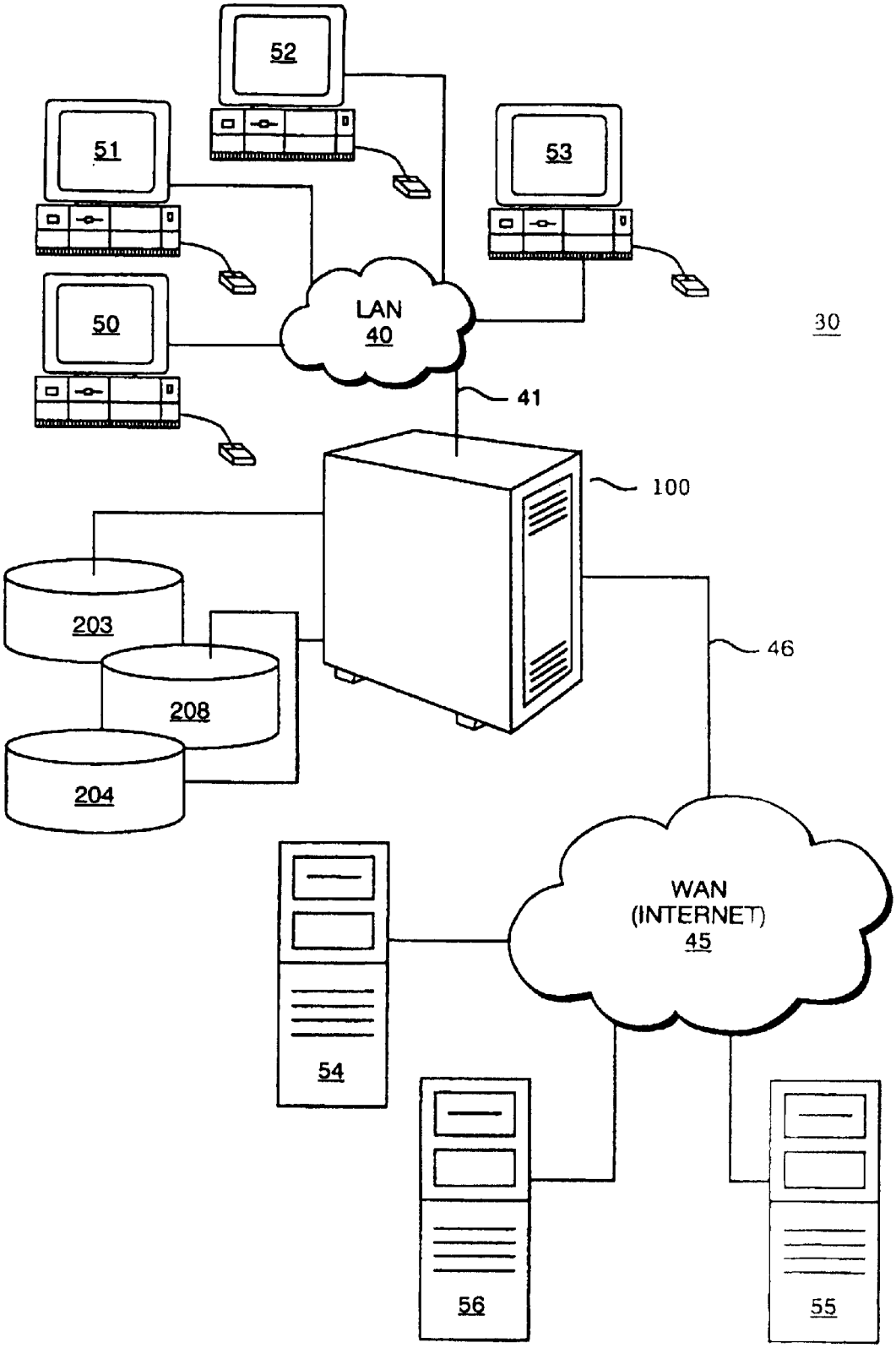
FIG. 1
AMENDED

CONTROLLING CLIENT ACCESS TO NETWORKED DATA BASED ON CONTENT SUBJECT MATTER CATEGORIZATION

Matter enclosed in heavy brackets [ ] appears in the original patent but forms no part of this reissue specification; matter printed in italics indicates the additions made by reissue.

*RELATED APPLICATION*

*This application is a reissue of application Ser. No. 09/052,236, filed on Mar. 31, 1998, now U.S. Pat. No. 6,233,618 B1.*

BACKGROUND OF THE INVENTION

Computer networks, including private intranets and the publicly accessible Internet, have grown dramatically in recent years, to the point where millions of people all over the world use them on a daily basis. The surge in the popularity of computer network use is due in large part to the vast amounts of data and information that is readily available to people at a relatively small cost.

As an example, a computer network application that uses a suite of protocols known as the World Wide Web, or simply "the web", permits computer users connected to the Internet to "browse" "web pages". To browse or "surf" the web, a person operates a client computer that executes an application program called a "web browser". The browser allows the user to submit requests for "web pages", which are data files stored at remote server computers called "web servers". The browser may also allow access to other protocols and file types beside web pages. The web servers return the requested pages and/or data to the browser for presentation to the user on the client computer. It is now common for web pages to contain many types of multimedia data including text, sound, graphics, still images and full motion video.

Like many other applications that use computer networks, the web uses various protocols to provide fast and efficient data communication. The process of requesting, sending and receiving web pages and associated data (i.e., surfing the web) over the Internet is handled primarily by a communication protocol known as the Hyper-Text Transfer Protocol (HTTP). However, web browsers and other networking applications can also use many other protocols such as the File Transfer Protocol (FTP), the Telnet protocol, Network News Transfer Protocol (NNTP), Wide Area Information Services (WAIS), the Gopher protocol, Internet Group Management Protocol (IGMP) for use in Multicasting, and so forth. Typically, these protocols use the data communication facilities provided by a standardized network layer protocol known as the Transmission Control Protocol/Internet Protocol (TCP/IP) to perform the data transactions described above.

Unfortunately, none of the aforementioned applications, protocols, nor TCP/IP itself provides any built-in control mechanisms for restricting access to web servers, pages of data, files or other information which the protocols can obtain and provide from servers. Restricted access to servers or data, for example, on the world wide web, may be useful in the home to deny access to objectionable web page material requested by children. A similar need is increasingly felt by information technology professionals in the corporate environment. Within many companies, reliable and ubiquitous access to computer networks is now a requirement of doing business. However, management increasingly feels the need to control Internet access, not only to prevent employees from displaying objectionable material within the workplace, but also to place limits, where appropriate, upon who can access certain information, such as web page content for example, and when this access should be granted. There is increasing concern within many companies, for example, that without some type of control on Internet access, certain workers will spend all day reading web pages devoted to news, sports, hobbies, and the like, or will download entertainment related software, for example via FTP, rather than access the web pages or data files which assist them in doing their job.

Currently available access control mechanisms for networked data are typically provided by either the server software, such as web or database server applications, or the client browser or client terminal software or a combination of both.

Various systems have been developed in an attempt to control access to networked data files in some way. For instance, U.S. Pat. No. 5,708,780 discloses a system for controlling access to data stored on a server. In that system, requests for protected data received at the server must include a special session identification (SID) appended within the request, which the server uses to authenticate the client making the request. If the SID is not present, the server requires an authorization check on the requesting client by forwarding the original request to a special authorization server. The authorization server then interrogates the client that made the request in order to establish an SID for this client. The SID is then sent to the client, and the client can then re-request the protected data using the new SID. In this system, access control is performed by customization of both the client and the server, and requires a separate authentication server.

Other schemes have been developed which place access control responsibility squarely within the client. Typically, these systems use what is known as data-blocking or web-blocking software. This software gets installed onto the client computer and controls the ability of the client browser software to receive data from certain restricted servers. As an example, for restricting access to web pages, client computers can install web-blocking software called Surf-Watch from SurfWatch, Inc, a division of Spyglass Software, Inc. Surf-Watch examines incoming web page data against a restricted content database. When a web page arrives at the client containing, for example, text data including obscenities that are listed in the restricted content database, the Surf-Watch program detects these words and disables the ability of the browser to display the page and informs the user that the page is restricted. This procedure is generally referred to as content filtering, since the actual content of the page or data itself is used to make access control decisions.

The person who administers such software (typically a parent or information technology professional) is responsible for selecting which topics or words of content are to be filtered. For example, Surf-Watch allows the installer to select topics related to sexual material, violence, gambling, and drugs or alcohol. These topics define vocabularies of words that will be used to define the scope of the restricted content database. Any page that is received and that contains a word defined within these categories will not be displayed to the user.

SUMMARY OF THE INVENTION

Prior art systems used for limiting access to data on the networked computers, such as those used for the world wide web, suffer certain drawbacks. For instance, in systems that place access control at the server, it is up to the administrator of the server to decide who should and should not have access to the data being served. Systems using authentication servers also require each client to have knowledge of the access control system in order to correctly append the SID to each request. The separate authentication communication between the server, the authentication server and the client creates additional network traffic—this in turn means that access times are slowed considerably, since they must first be processed by the remote authentication server.

In systems that place access control at the client, it is up to the administrator of each client computer (i.e. the parent or information technology professional) to determine how the access control software is installed and configured on the client computer. Since client browsing and access control software is typically installed on a personal computer, easy access to the operating system and software stored on the computer disk make it possible for the restricted users (i.e., children or employees) to de-configure or un-install the blocking software, unbeknowst to the administrator. In environments such as schools and corporations, maintaining each client installation of, for example, web-blocking software as a separate system thus becomes a quite cumbersome administrative task.

Furthermore, content filtering based solely upon supposedly objectionable words is not foolproof. For example, a word such as "breast" might be considered to be objectionable, and the blocking software might typically be set to block access to any web page or data file requested that contains that word. However, a web page or FTP site, for example, as published by a respected government research center, may in and of itself not be objectionable simply because it contains pages or files containing that word. Indeed, such a page or file may be highly relevant and even desirable for access by, for example, a high school student performing research for a science project devoted to cancer risks in adult women.

In other instances, there may not be keywords associated with objectionable content. For example, a web [pages] *page may* simply consist of one or more objectionable pictures without embedded keywords. Similarly, an FTP site may simply consist of a directory with one or more graphics files which are objectionable. Content filtering based on keywords does not help with either situation.

The present invention overcomes these and other problems of prior art network data access control systems. This invention exists typically as a software program installed on a network device interconnected between typically a first and second computer network. The network device may, for example, be a proxy server, bridge, router, or firewall. The first network may be a local area network (LAN) located, for example, at an Internet service provider (ISP) or within a corporate or other private intranet. The second network may be the Internet or other large wide area network.

The network device is responsible for controlling access by client computers to data available from server computers, when those requests are made via any one or more of a variety of protocols such as HTTP, FTP, Gopher, Telnet, WAIS, NNTP, and so forth. The invention is extendable to provide access control for other types of data access protocols used to transfer data between computers as well, such as protocols that will arrive in the future to perform data exchange or data transactions. The network device includes, typically, a data processor providing a first interface for receiving requests from clients, such as may be connected to the first network, for data stored on servers on the second network.

The network device also includes an access control process coupled to the first interface. The access control process analyzes data in each request from the clients and determines if the request should be forwarded to the second network for processing by a server to which it is destined. The determination to forward or not is made by cross referencing information in the request with access control data in at least one access control database, that may be, for example, stored locally within the network device, but that can be provided from a remote source, such as a subscription service providing periodic access control database updates. By automating the access control database update process, the invention does not have to burden its owners or users with constant maintenance.

The network device also includes a second interface coupled between the first and second network and the access control process. The second interface forwards the requests from the first interface to the servers on the second network if the access control process determines the request should be forwarded to the second network for processing by a server to which it is destined. The information in a request provides the required information, including address data indicating a source of the request and also may include either a Uniform Resource Locator (URL) or an address of the data specifying a specific page of data, a "web page", a file, or a specific service to be supplied by a remote server to which that request is destined. That is, no matter what the application is, such as world wide web access, FTP access, Telnet access, and so forth, the information in the request identifies the source (i.e., who or which client is making the request) and identifies what server or remote computer will supply data in response to the request. This information is matched to the access control databases of the invention before being allowed to be forwarded from the second interface.

In this manner, the invention provides access control not primarily upon content, and not at either the server or the client, but rather, based upon the requests made by whom, at what times, and according to different categories of subject matter, as will be explained in detail below.

The invention further avoids the problems of the prior art which categorizes or filters the content of web pages based solely upon objectionable words. For example, the category database used by the network device to control access is preferably created via a process involving human editors who assist in the creation and maintenance of the category database. The editors review the URLs or addresses of new uncategorized web pages, data files, or server machines, and evaluate the content of the web site and web pages or data files or server information referenced by the URL or address, placing that URL or address into one or more of the categories.

The invention also provides for automatic updating of the various access control databases, for example, over the network, so that the access control mechanism is always using the most recently discovered network data which is determined to be restricted in content. Automatic updates may be provided, for example, using SNMP managed network devices that can synchronize local access control database(s) with a master database for example.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates an example networked computer environment in which the present invention may be used.

DETAILED DESCRIPTION OF A PREFERRED EMBODIMENT

Figure 2:
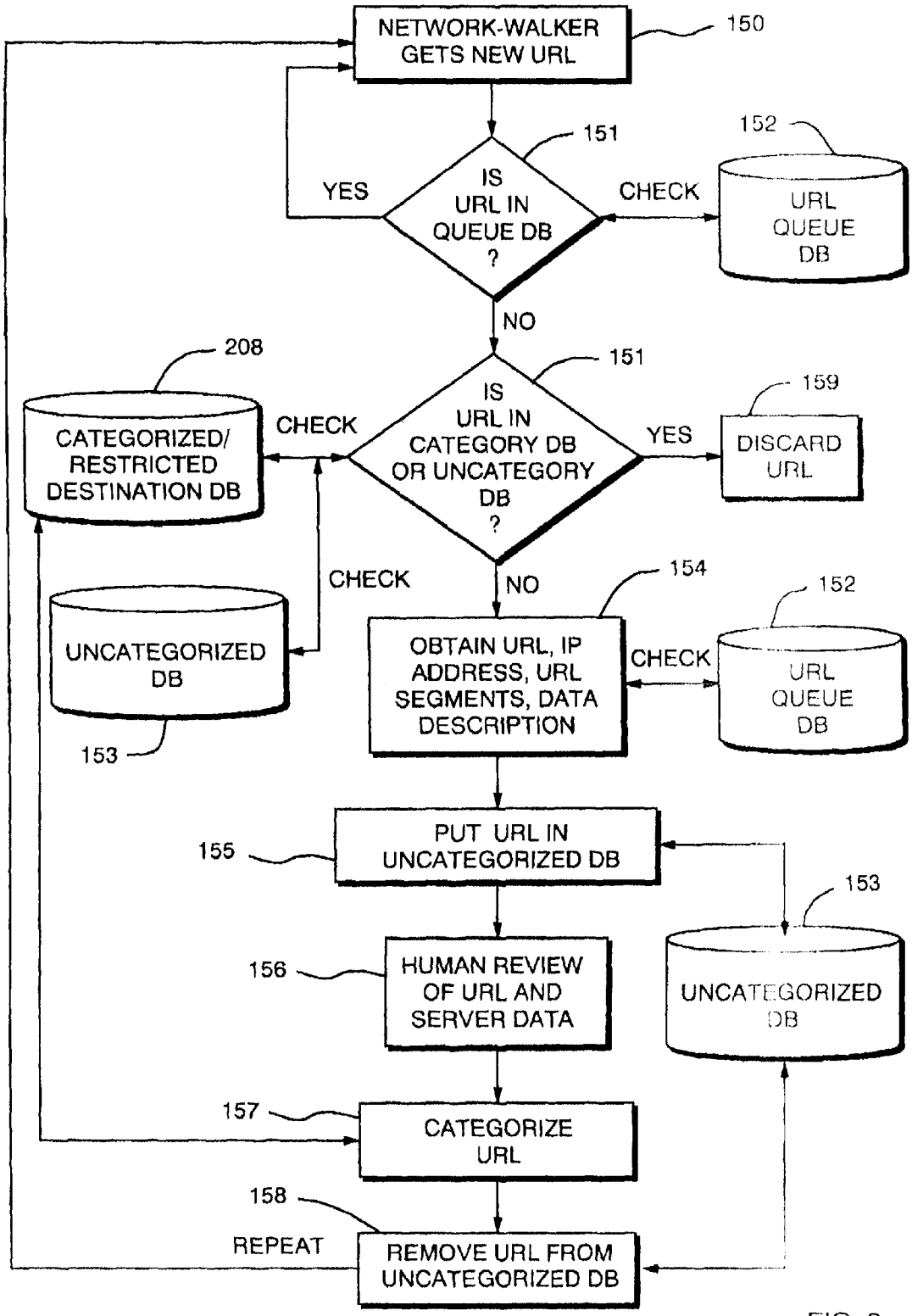
FIG. 2 shows a flow chart of the general processing steps for configuring the databases used by the invention.

FIG. 1 illustrates an example networked computer environment 30 in which the present invention may be implemented. The networked computer environment 30 includes a first or Local Area Network (LAN) 40 composed of client computer hosts ("clients") 50 through 53, a second or Wide Area Network (WAN) 45 including server computer hosts ("servers") 54 through 56, and a network device 100 having access control databases [230] *203*, 204 and 208. The network device 100, is connected to permit data communication between the Local Area Network 40 and Wide Area Network 45, and is in particular configured according to the present invention to provide an access control mechanism for all data information requests made from clients to servers, such as, for example, web page, news server, or FTP data or application download requests.

While the invention is applicable to many types of data transfer operations made from client to server computers, the preferred embodiment described herein relates primarily to world wide web page access. However, it is to be understood that the invention is applicable to access control to other types of data provided by other protocols such as Gopher data provided by Gopher servers, FTP servers, Usenet News servers, Multicast Backbone (MBONE) Servers, and so forth. The invention may also be used to restrict access to actual application software provided by servers, such as, for example, [Java] *JAVA*™ applets served from dedicated application servers. (*JAVA*™ *is a trademark of Sun Microsystems*™*, Inc., Santa Clara, Calif., U.S.A.*).

In FIG. 1, the Local Area Network (LAN) 40 inter-networks the clients 50 through 53, and the Wide Area Network (WAN) 45 inter-networks the servers 54 through 56. WAN 45 may be, for example, the Internet, and LAN 40 may be, for example, any type of computer network such one used in a corporate, institutional, Internet service provider (ISP) or similar setting in which multiple computers access each other and the WAN 45. The LAN 40 and/or WAN 45 may be implemented using Ethernet, ATM, FDDI, SONET, token-ring, wireless or other types or combinations of physical network layer topologies.

The clients and servers 50 through 56 may be workstations, personal computers, or other data processing devices linked via the LAN and WAN communication mediums which operate a protocol that supports high-speed data communications, such as, for example, the Transmission Control Protocol/Internet Protocol (TCP/IP).

The LAN 40 is coupled via a network link 41 to the network device 100, which is in turn coupled to the WAN 45 via network link 46. The network device 100 may be, for example, a router, proxy server, firewall, bridge, hub, switch, or other data transfer, switching or network device that allows data, usually in the form of frames, packets or datagrams, to be transferred back and forth between the LAN 40 and the WAN 45. In the context of this invention, network device 100 is usually owned and administered by the same organization that owns and administers the LAN 40. The network device 100 serves as the "gateway" through which all data communications must pass between the two networks 40 and 45. Such a gateway may be located at an Internet service provider (ISP) wherein the clients are connected to the LAN via dial-up modems, or within a corporate or other institutional environment, between the LAN and an Internet connection. While not shown, it is noted that the invention may employ more than one network device 100 to provide access control to clients on LAN 40 between many different WAN's or to the same WAN 45.

As a "gateway", the network device 100 according to this invention is configured also to monitor the data communications that pass between clients connected to the LAN 40 and servers connected to the WAN 45. The network device 100 can, for example, detect requests for web pages, files or other data from any of clients 50 through 53 to servers 54 through 56. The network device 100 then either allows or denies the detected web page or information requests based on an examination of the content of the specific requests in comparison with access control data stored in databases 203, 204 and 208.

By locating the access control decisions in neither the server nor client computers 50–56, but rather, within network device 100, web page and data access for all clients 50 through 53 may be controlled as a group, without any separate client or server configuration required from the administrator who operates the network device 100. Also, since a firewall, bridge, router or gateway to the Internet, for example, is typically isolated from physical and logic access by users, a trusted systems administrator can be responsible for administering an access control policy which is more difficult to circumvent than when left up to the users of the clients or servers.

In order for network device 100 to be able to make access control decisions regarding requests for web pages, files or other information provided by servers, it must be configured with access control data such as stored in databases 203, 204 and 208. The access control data defines which clients can access which web pages or data from remote servers at what times and under what conditions. Users of the client computers in this invention are assigned to various groups, which may, for example, be based on that persons responsibilities within the organization that is using the system of this invention. If a user is in a particular group, the invention can further limit access control to, for example, web pages, data, programs, files or documents for that group at certain times, while not limiting access at other times. Still further, this invention provides the ability to limit access control to web pages or data provided by servers that fall into many different categories. That is, access control is provided based on the categories or types of data to be accessed, on groups of users, and on the time during which access is requested.

As an example, in a high school environment having a LAN within the school, the network device of the invention can have access control databases configured to restrict access to a remote network server that serves (i.e., allows remote playing of) [Java] *JAVA*™ applet chess games. The network device which allow access to the server only by the chess club members of the school and only if they are using the chess club computers in the chess club meeting room and only during chess club meeting hours. Other users of the schools LAN computer network using computers located elsewhere in the school at different times (or even during chess club hours) can be restricted from accessing this server over the Internet using the invention.

An explanation of the databases 203, 204 and 208 will clarify the nature of the access control capabilities of the invention.

Database 203 is called the group/source database. A simple example of the data in this database is shown in Table 1.

TABLE 1

Group/Source Data

| GROUP | SOURCE |
|---|---|
| LIBRARY | CLIENT 50<br>CLIENT 51 |
| FACULTY | CLIENT 52 |
| PRINCIPAL | CLIENT 53 |

In FIG. 1, each client computer 50 through 53 may be associated with one or more groups used for access control in this invention. Suppose, for example, that LAN 40 is used within an elementary school system and the group/source database 203 in Table 1 is configured for such an environment. Client computers 50 and 51 may be located in the library, while client computer 52 may be located in the faculty lounge, and client computer 53 may be in the principal's office. Accordingly, in this example, the group/source database 203 may list three groups in column 1 of Table 1; library, faculty, principal. Each group will have one or more associated client addresses (i.e., sources) and/or usernames identifying which users (via which client computers) are in which groups. Column 2 in Table 1 associates each source client computer to a group.

In the example shown in Table 1, client computer numbers are used. In a preferred embodiment, the computer numbers used by the group/source database 203 are preferably machine address (i.e., Internet Protocol ("IP") or Media Access Control ("MAC") addresses, as will be described below) to identify sources, or sources may be broken down even further to the username level, such that no matter which client computer a specific user logs in at, that user will always be associated with his or her respective group. In such a case, groups would have sources containing usernames, instead of hostnames, or sources may be username/hostname pairs. As will be explained, the group/source database 203 will be used to determine who is requesting the information over the network, such as web page data for example, and what their level of access is.

Table 2 below provides an example of the data contained in the Group/Category database 204.

TABLE 2

Group/Category Data

| GROUP | RESTRICTED CATEGORIES |
|---|---|
| LIBRARY | 1, 7, 9, 11, 18, 19, 22, 24, 28<br>TIME: 1-4 pm |
| FACULTY | 1, 9, 18, 19, 24,<br>TIME: 8am-11:59 am, 1 pm-4 pm<br>Monday-Friday |
| PRINCIPAL | 4, 13, 14, 16, 17, 20, 21, 23, 25, 26, 27<br>TIME: 2-4 am, 6-11 pm |

As shown in Table 2, data contained in the group/category database 204 associates each group with the restricted categories for that group and other access attributes such as the time of day during which those groups are restricted. For instance, a user of a client computer who is in the faculty group will be restricted from viewing web pages that fall into categories 1, 9, 18 and 24 from 8 am to 11:59 am (i.e., morning work hours) and from 1 pm to 4 pm (i.e., afternoon working hours) during every Monday through Friday (i.e., workdays). The principal of the school, however, is allowed to access all internet servers, web sites, and data at all hours except from 2 to 4 am and 6 to 11 pm. As will be explained shortly, each category is associated with a specific topic, such as sex, violence, drugs, and so forth. In one embodiment of this invention, there are thirty different categories. Thus, if a user of a client computer is excluded from certain categories, when they make a request for a web page or a server location or a data file having an Internet access address that appears in one of those categories in the category/destination database 208 (to be explained), that user will be denied access to that data, file, applet, web page, and so forth.

The data in databases 203 and 204 may be configured by the administrator of the system. The data may be stored in any form of database format, such as in a relational database format, for example. It is noted that databases 203, 204 and 208 must be accessible to network device 100, but need not be located within or directly attached to network device 100. For instance, a file server using the network file systems (NFS) can be used to provide network device 100 access to databases 203, 204 and 208, each though the disks storing the data are located elsewhere on [LAW] *LAN* 40, for example. Alternatively, the databases 203, 204 and 208 can reside in the network device itself.

The third database used by network device 100 for access control is the category/restricted destination database 208. This database is a key element of the invention, and provides a list of the Uniform Resource Locator (URL's) including URL segments, and IP addresses, for servers containing restricted files, applets, documents, web pages, news groups, Multicast sessions or other content, for each category. The size of the database 208 can vary and may be very large in some instances. An abbreviated example of the contents of the category/restricted destination database is given in Table 3.

TABLE 2

Category/Destination Data

| CATEGORY | URLS | URL SEGMENTS | IP ADDRESSES |
|---|---|---|---|
| 1. Alcohol | alcohol.com,<br>www.drink.com,<br>www.intoxicated.com | /www.drink.com/margarita | 12.34.105.23<br>213.56.3.12<br>224.0.0.0 |
| 2. Alternative Lifestyle | /www.hermit.com/ | /www.recluse.com/hate-people | 201.2.123.67<br>145.23.1.231 |
| . . . | . . . | . . . | . . . |

In Table 3, each category is listed as a number, along with its name indicating the subject matter associated with that category. There are only two categories shown in this example for ease of description. The categories are matched in Table 3, and in database 208, with the server address including document locations (e.g., locations of web pages via URLs) and IP address which are to be restricted for a group having those categories. For instance, category 1 is alcohol. In columns 2, 3 and 4 of this category, URL's and segments of URL's and IP addresses are listed which indicate which addresses of files, documents, web pages, web sites and other information on the network, Internet, or world wide web that are restricted for access within that category. For instance, under the category alcohol, no access is allowed to the web site in column 2 listed as alcohol.com, and no access is allowed for requests to the IP address 213.56.3.12, which may correspond, for example, to the home page of a bar, brewery, or other drinking establishment.

As another example, in the IP Addresses Column in [table] *Table* 3, IP address 224.0.0.0 is listed, which corresponds to a special type of IP address reserved for Multicast Broadcast data streams. Thus, access to Multicast data streams accessed via user applications running on clients [53] *50* through 53 may be restricted as well, through the use of this invention. This example illustrates that the invention is applicable to restricting access to data other than just world wide web page or URL data. Those skilled in the art will now readily understand that other address mechanisms which may be similar in nature to URL or IP addresses may be incorporated into the access control databases of this invention to restrict access to the locations of data, documents, files or the like over a computer network.

In this invention, the category database 208 is created separately for the operation of the network device 100, for example, by a third party other than the owner and administrator of the network device 100. That is, since the category database must contain, for example, all of the web site URL's, home pages addresses, IP addresses, new groups, data and file locations, and other information indicating destinations for requests that are to be restricted, this information can become quite voluminous, and in a preferred embodiment, is created as a single master database 208.

Access to the master category database 208 may be incorporated into the network device 100 in various ways, each of which is within the scope of this invention. For example, as noted previously, the category database 208 may be stored and updated in a database locally on a hard disk within the network device 100, using update disks periodically loaded onto the network device 100. Alternatively, the category database 208 may be provided to the network device using a protocol, such as the Simple Network Management Protocol (SNMP), which may use an agent running locally on the network device 100 to control network device configuration and database content from a remote network manager station, which can be controlled by a third party offering a subscription to periodic database updates. Thus, any organization implementing the present invention can merely receive a copy of the category/restricted destination database 208 for use with their system without having to be concerned with the installation of the data.

Since the Internet topology, IP addresses, server location, and the World Wide Web are all constantly changing and URL's, web servers, news sites, Multicast channels, and so forth are all being added and removed from networks such as the Internet on a daily basis, using this invention, one organization can keep the master category database 208 current and up to date, and each organization that uses the database 208 in conjunction with their own network device 100 can subscribe to, for example, a monthly update or subscription service. In this manner, using SNMP or an automated download service, for example, the database 208 may be distributed to the network devices 100 of all subscribing organizations for use, and each organization need not worry about keeping their category database 208 current with the current state of the world wide web. The entire update process may be done over either LAN 40 or WAN 45, without the need for sending physical disk media through the mail or postal service.

FIG. 2 shows the processing steps involved according to this invention to configure network device 100 with the access control database 208. Step 150 provides an automated network-walker whose function is to continually examine the world wide web, and any other accessible networked data servers for new addresses, files, web sites, home pages, documents, Multicast channels, and so forth. The network-walker is an automated knowledge robot software process which continually surfs the web and examines Internet content providers to gather newly found URL's and IP addresses of web servers or other content providing computers.

For purposes of this explanation, the term URL, for Uniform Resource Locator, refers to the location of any type of content on a computer network, and not just to web pages or information obtained via HTTP. Thus, each time a new URL or address of a content server is obtained or discovered by the network-walker, step 151 checks to determine if the new URL is contained in any one of three databases. The first database is a URL queue database 152 that stores the new URLs in incoming order for processing by subsequent steps. If the new URL in step 151 is not in the URL queue database 152, an uncategorized URL database 153 is then checked. Database 153 holds [URLS] *URLs* that must be categorized, as will be explained. If the new URL at step 151 is not in databases 152 or 153, the category/restricted destination database 208 is checked. *If the new URL is in one of databases 153 or 208, the URL is discarded, in step 159.* If the new URL is in none of these databases 152, 153 or 208, step 151 places the new URL into the URL queue database 152.

Step 154 gets the next URL from queue database 152 and determines the network address (i.e., IP address) of the server (i.e. for example, one of web server 54, 55 or 56 in FIG. 1) that provides the content of the URL, and determines any URL segments within this URL. A URL segment may be a sub-page, for example, that may exist below a home web page. For example, if the URL is www.xxx.com, a segment of this URL may be www.xxx.com/pornography/photos.

Alternatively, in another example, if the URL represents a news server using NNTP to propagate news groups over a network, the URL may include the IP address of the news server and URL segments may represent individual news groups offered by that server. As another example, if the URL is the IP address representing a Multicast address of a channel of real time audio and/or video information, a URL segment may be represented by Multicast addresses of sub-channels within the domain of the IP Multicast address. Thus, if the network-walker detects a new Multicast channels being broadcast on address 224.0.0.0, the network-walker may log 224.0.0.1, 224.0.0.2, and so forth as Multicast sub-channels or URL segments in this invention within queue database 152.

Step 154 also attempts to obtain a description of this URL by accessing, for example, the home page to which it a web-page URL refers to. A description of a home page, and hence its URL, may exist in the Hypertext Markup Language (HTML) that is used to actually create and format the data which comprises an actual web page. In an alternative example, in the case of the URL that is only an IP address or a Multicast address, other identification about the content server provider may be obtained, for example, by using the "whois" internet network information service or another similar protocol-based information service. "Whois" is a protocol that is used in conjunction with an IP address, by issuing, for example, the command "whois 224.0.0.011" and awaiting a response. A Multicast server that is properly configured typically returns an indication of who owns and administers the server machine at the specific IP address that is providing the content, as specified in the "whois" protocol, and also returns information concerning the IP Multicast address content. This description and information received is obtained and stored by step 154.

In the www.xxx.com example, step 154 may obtain, for example, a page or meta-description of the entire web site that may look something like "www.xxx.com is an adult oriented site supplying pornographic images to web browsers." In the Multicast example, whois may return "1244.0.0.0 is an internet Multicast channel served from a [SUN] *SUN*™ Workstation at XYZ Corporation and is dedicated to providing real-time audio and video information on religious activities." (*SUN™ is a trademark of Sun Microsystems™, Inc., Santa Clara, Calif., U.S.A.).* This description is saved in step 154, since it may be relevant for determining the category of the web site or content server, which in the first case is sexual material, and in the later case is religious material.

Next, in step 155, the new URL and its associated data gathered in step 154 are placed into the uncategorized database 153 until the server, data stream or web site for this new URL can be examined for content by a person in order to precisely associate one or more categories with this URL.

In step 156, a person who assists in the creation and maintenance of the category/restricted destination database 208 reviews the next URL at the top of the list from the list or URL's in the uncategorized URL database 153. In step 156, the person may use, for example, a web browser to visit the actual web site specified by the URL, or may using a Multicast receiver application or a news reader application to view the data provided by the server specified in the current URL. While visiting the web page or examining or listening to or viewing the data provided from the server listed in the URL and that URL's associated URL segments, the person, in step 157, makes a determination about the content of the server (e.g., a web site) referenced by the URL and places that URL into at least one, and typically more than one, of the categories in the category/restricted destination database 208. Using the previous examples, the www.xxx.com website URL would be placed into the pornography or sexual material category and the religious Multicast channel would be placed into the religious category. Accordingly, at step 157, that server or web site or content provider and its associated pages, data streams, files, news groups, and so forth are now in the database 208 which can be used for access control. Finally, in step 158, the URL associated with the data is removed from the uncategorized database 153.

While not shown in FIG. 2, processing continually repeats itself, and many concurrent iterations of the processing steps 150 through 158 may be taking place at one time. Accordingly, there may be a number of different people in step 156 that have the job of reviewing and categorizing content provided by servers, web pages and web sites, IP addresses, Multicast addresses, news groups, public mail servers, etc. Moreover, the network-walker in step 150 is continuously obtaining new information about current content providers on the computer network, such as the Internet. These tasks, and the processing of FIG. 2, are typically performed by the service organization that provides the category database 208 to all of the subscribers who utilize this aspect of the present invention with their network device 100, in order to have up to date access control provided to their LAN 40.

In this manner, by processing the steps of FIG. 2, a very thorough category/restricted destination database 208 is created and maintained. The network-walker function in step 150 is constantly examining the network (i.e., the Internet, World Wide Web, etc.) for the latest URLs that come into existence, and they are then processed as described above.

It is to be understood that the processing steps in FIG. 2 are typically not be performed by the network device 100, though the administrator of LAN 40, who may control network device 100, could, if he or she wanted to, perform the processing of FIG. 2 in order to add other URL's to database 208. However, in a preferred embodiment, network device 100 merely obtains access to databases 203, 204 which are locally configured during the setup of each network device 100. Database 208 is accessed locally, but is routinely update by downloading or automatically transferring (i.e., via an SNMP agent or FTP) the latest created version from a centralized location such as a provider of a subscription service to the database 208. Once each of the databases 203, 204 are configured and database 208 is downloaded and made available to the network device 100 somewhere on LAN 40, the network device 100 can then operate to provide complete access control of server, web pages, and other types of content for users of the client computers 50–53 connected to LAN 40, according to the aforementioned aspects of the invention.

In operation of the access controlled network computer environment 30 according to the access control aspect of the invention, one or more client computers 50 through 53 are configured with standard web browsing or content accessing application software (not shown) such as, for example, the commonly known web browser [produced by Netscape, Inc. entitled "Netscape Navigator" (TM)] *Netscape Navigator®*, or, [Microsoft Corps.] *Microsoft® Corporation's* browser software entitled [Microsoft Internet Explorer (TM)] *Microsoft® Internet Explorer®*. (*Netscape Navigator® is a registered trademark of AOL® LLC, New York, N.Y., U.S.A., Microsoft® and Internet Explorer® are registered trademarks of Microsoft® Corporation, Redmond, Wash., U.S.A.*). Another example of content accessing software is an Internet Radio program that joins a Multicast group in order to listen to real-time audio. The browser or content application software need not be modified or customized in any way for this invention to work properly. The clients, browsers and content applications need not actually be part of the invention, but rather, benefit from the invention's access control capabilities. The browsers or applications on each client computer 50 through 53 allow users to request pages or data or other information from server computers 54 through 56 on the Internet, while still being subject to access control provided by the network device and its configuration and databases provided by the invention.

As an example, for client 52 to request a web page from server 55, client 52 uses the Hyper-Text Transfer Protocol, which operates in conjunction with TCP/IP, to produce a packet of data (not shown in FIG. 1) that gets sent from the requesting client 52 onto the LAN 40 to be forwarded and received by server 55. In the invention, based on the contents of the packet sent from client 52, a determination may be made in network device 100 as to whether or not the request should be forwarded to WAN 45 and thus to server 55. As another example, if a client application desires to receive Multicast packets of Internet packet radio broadcasts, client 52 uses the Internet Group Messaging Protocol (IGMP) to produces a packet requesting to join a specific Multicast group. The IGMP request must pass through network device 100 in order to obtain Multicast Group access to a server supplying the Multicast data.

In order to explain how the network device 100 operates as an access control system for all data requests from client computers 50 through 53 on LAN 40, a brief explanation of network packet communications and content is needed.

Figure 3:
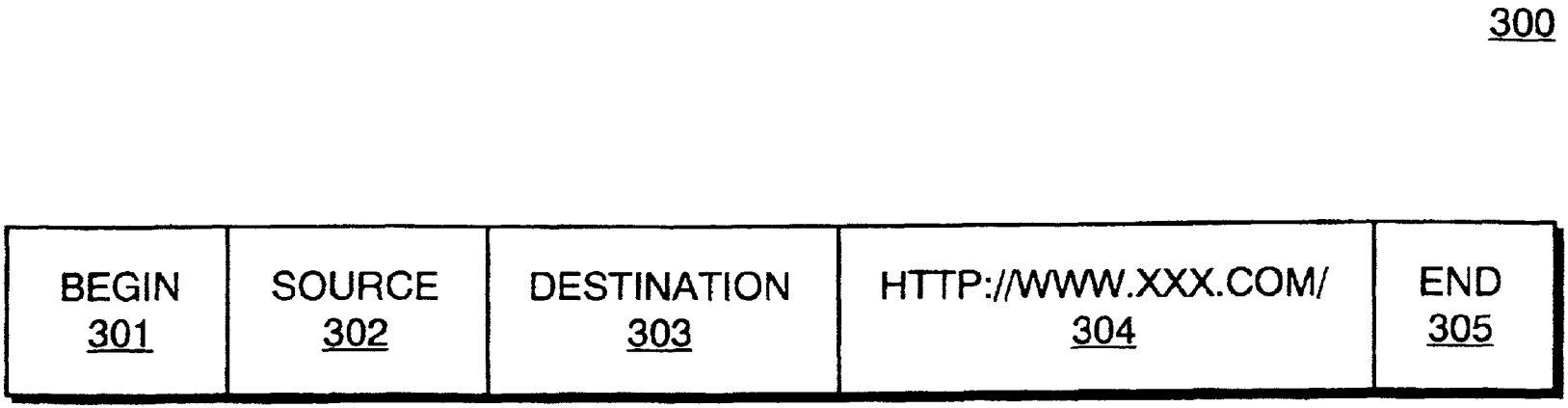
FIG. 3 illustrates a simplified example of the contents of a packet as used in this invention.

FIG. 3 shows a highly simplified example breakdown of the contents of a data packet 300 that carries a request for a web page from client 52 to a server 44. Access to a web page will be used in this description, but other content services using other protocols are applicable to this invention as well. Packet 300 contains fields 301 through 305. It is to be understood that packet 300 is highly simplified and does not reveal all of the fields or contents of packets typically used in data communications. Rather, the packet 300 illustrates only those fields needed to understand the concepts of this invention.

Packet 300 includes a beginning field 301 recognizable by network device 100 as the start of a packet, and an ending field 305 recognizable as the end of the packet. The source address field 302 indicates the source of the data packet, which is the network address of the client computer sending the request. Source address field 302 may contain, for example, IP and/or Media Access Control (MAC) addressing information. The destination address field 303 indicates the destination network address of a remote server computer that is to receive packet 300, and may also contain IP and/or MAC layer addressing information. The data field 304 is used to transport the data or payload of the packet from the browser application (i.e., Netscape) on the client 52 to the web server software operating on the web server 55. In the example shown, the data field 304 contains the request in the form of a full Uniform Resource Locator (URL) for a web page. A URL serves as the indicator of the request from the client for a specific web page stored one of the servers, and can be detected by network device 100.

Figure 4:
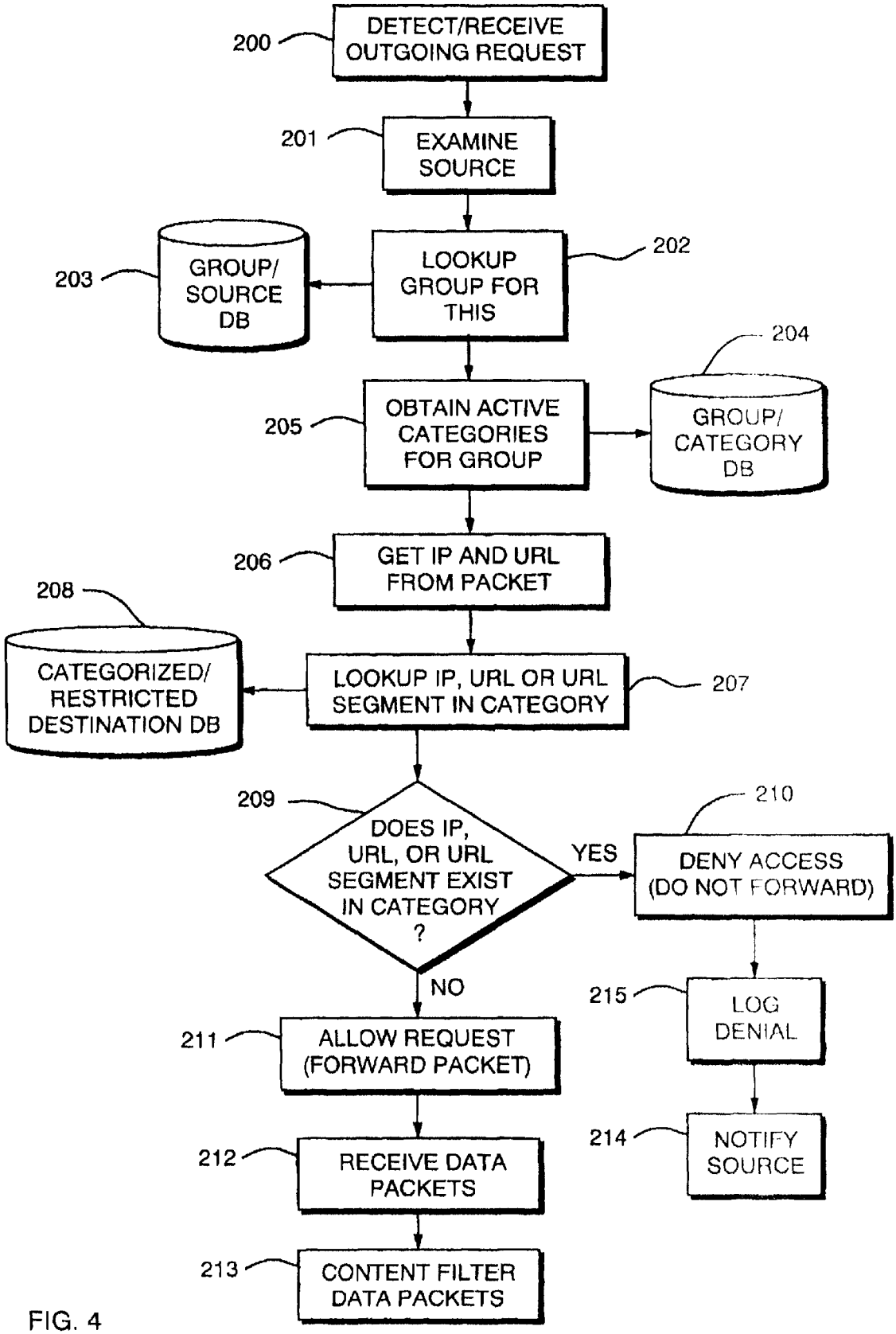
FIG. 4 shows a flow chart of the general processing steps performed by a network device according to this invention.

As noted previously, to perform access control, packet information is compared against database information within network device 100. FIG. 4 shows the processing steps performed by network device 100 to perform access control according to this invention. Since network device 100 serves as a gateway, router, proxy server or other data transfer mechanism to the WAN 45 from the LAN 40, the network device 100 can also monitor the contents of outgoing packets traveling from LAN 40 to WAN 45 for such data as HTTP level request messages for URLs, such as an HTTP "GET" message. As noted previously, other requests for others types of network content provided by servers, such as news group requests, IGMP Multicast group join requests, FTP file transfer requests, and so forth may also be incorporated into the monitoring facilities of network device 100 in this invention. During this monitoring process, in step 200, the network device 100 receives and detects a packet containing, in this example, an HTTP request in data field 304 of the packet. The detection can be done, for example, using an application programming interface (API) that allows the network device 100 to screen any selected packet field for information, such as addresses and data in all outgoing packets. The network device 100 can, using an API provided, for example, by proxy server software running on the network device 100, also detect IP port, TCP socket and/or session numbers which packets are associated with as well. HTTP and most other network protocols typically associate themselves with either a specific port, socket, IP address, session number, or other unique identifier within TCP/IP, which is another way the network device 100 can detect the presence of a packet containing a request for a web page, data file, audio or video stream, news group, file transfer, and so forth.

In the web access example, once a web page request is detected in a packet, in step 201, the source address of the packet in field 302 is examined. The source address may be an IP address, or a MAC address, or an address/username combination. Then, step 202 matches the source address and data with the group/source database 203 (i.e., Table 1) in order to determine the group in Table 1 to which the packet containing the HTTP request belongs. In other words, the packet came from one of clients 50 through 53. Hence, step 202 matches packet information to group information such as that shown in Table 1, in order to determine which client and/or user on LAN 40 is sending this particular web page request packet and determine what group that machine or machine/username combination is in within database 203.

Next, step 205 obtains the active categories for the group determined in step 202, by consulting the group/category database (i.e., Table 2). Thus, step 205 obtains a list of all of the categories which are to be consulted to see what restriction are placed on the requested URL, IP address, or other content destination. That is, step 205 determines what groups can access what categories of content and when. Note that the categories are referred to as active since they are only selected for checking in step 205 if the current time of day listed for those categories is applicable at the current time, based on the current system clock time in the network device 100. That is, step 205 determines, based on the identification of the group of the person or client requesting the page or data in step 202, which categories for that group (i.e. the person requesting the page or data) are restricted and at what times those categories for that person (i.e. that group) are restricted.

Step 206 then obtains the actual URL and the destination IP or other type of address from the data field 304 and the destination field 303, respectively, of the packet sent by the client. Step [208] *207* then matches the IP address, the URL, or any segment of the URL against each category obtained in step 205 in the category/restricted destination database 208. In step 206 then, each category specified as being active for the group of the client requesting the web page or data is consulted to see if the requested page or data is listed in any of the URL or IP data associated with that category.

In step 209, if either the IP address, the URL or any segment of the URL matches to any restricted destination information (i.e., columns 2, 3 or 4 of Table 3) for any of the categories obtained in step 205, then step 210 is executed which denies access to the requested web page, data, service or content requested in the packet received rom the client at the network device 100. In other words, step 210 does not forward the packet on to the content server indicated in the destination field 303 of the packet if the client in the specific group was requesting a page or data or a service that existed in the category database 208 for one of the categories that was active for that group. Quite simply, the client was trying to access a restricted web site or URL or IP address or service and step 209 detects this information in one of the active categories in database 208 and step 209 can deny access.

In step 209 does detect an attempt at restricted access to a service, web site, data or other restricted content, step 214 is executed which uses the source address in field 302 of the packet 300 to send a return notification of denial to the user at the client computer requesting the restricted data. Step 215 may also be executed which logs the illegal attempted request to a log file.

However, if step 209 determines that neither the IP address, the URL, or any URL segments matched any of the restricted data for any of the active categories obtained in step 205, then step 211 allows the request to be forwarded to the content server through network device 100. In other words, the request was for legitimate non-restricted web pages, services, or data provided by a server on WAN 45. Once the request is received by the server to which it was destined, the server begins to return the requested data in the form of a web page, a file transfer, a news group, or other data.

Step 212 then begins to receive the web page or other content data packets and step 213, which may be optional, can filter the incoming data in the returned data packets for objectionable data, such as profanity occurring in the text of web pages or news groups or other objectionable content as may be defined. That is, content filtering may also be incorporated into the invention as data is returned from the servers. This is beneficial and overcomes the problems of the prior art content filtering systems since in this invention, the content filtering can be centralized at the network device 100, rather that administering many separate clients that each contain their own content filtering database.

In this manner, the present invention provides a robust data access filtering system that provides access control based on users, categories and times of use and not purely on content of data being accessed. This is beneficial since content filtering alone often overlooks objectionable material such as pornographic images, which contain no words to content filter upon.

Moreover, the present invention is centralized to offer ease of administration and configuration and is very flexible since times of day for restricted access may also be specified, if desired. By having a category database 208 that may be maintained offsite, by a third party for example, the invention allows the administrator to only have to worry about initial group/source configurations, and not worry about database maintenance. New client computers that suddenly appear or get installed on LAN 40, that are not yet listed in the group/source database, can be assigned a default group that has highly restricted access associated to it in this invention. In this manner, the invention can handle future LAN 40 client expansion without having to further configure the new clients for access control.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A *hardware* network device for controlling access by clients on a private network to [a data file] *data files* stored at servers in a public network, the *hardware* network device being interconnected between the private *network* and *the* public [networks] *network*, the *hardware* network device comprising:

a first interface receiving a request from [a client] *one of the clients* on the private network to access [a data file] *one of the data files* stored at servers [on] *in* the public network;

an access control processor coupled to *the* first interface, the access control processor analyzing data in the request from the [client] *one of the clients* and determining if the request should be forwarded to the public network for processing by a server*, of the servers in the public network,* to which [it] *the request* is destined, the determination being made by cross referencing resource identifier information in the request with access control data in at least one access control database, the access control data containing categorized resource identifier information, the categorized resource identifier information specifying a content subject matter category to which the [data file] *one of the data files* is assigned, and the categorized resource identifier information associated with each data file *so categorized* being assigned by prior *locating of each data file, storing data file information comprising a uniform resource locator for each data file in a first database, reading the data file information for each data file from the first database,* human interpretation of the content in [the] *each* data file, and then, as a result of such human interpretation, determining a subject matter category to which [the] *each* data file is to be assigned, [the data file stored at the servers on the public network] *and storing said data file information and said subject matter category in the access control database*;

a second interface coupled between the first interface and the public network and coupled to the access control processor, the second interface forwarding the [requests] *request* from the first interface to the servers [on] *in* the public network if the access control processor determines the request should be forwarded to the public network for processing by [a] *the* server to which [it] *the request* is destined; and means *for* permitting a network administrator of the public network to control the operation of the *hardware* network device.

2. The *hardware* network device of claim 1, wherein the access control database is stored locally on a storage medium within the *hardware* network device.

3. The *hardware* network device of claim 2, wherein the access control database is downloaded by a download process on the *hardware* network device onto the storage medium from an access control server.

4. The *hardware* network device of claim 3, wherein the download process is automatically performed at regular intervals.

5. The *hardware* network device of claim 3, wherein the download process is a subscription service [to] *with* which the *hardware* network device must be registered [with] so that the download process can be performed.

6. The *hardware* network device of claim 1, wherein the access control database is stored remotely on at least one access control server on the private network and access to the access control data in the access control database by the *hardware* network device is performed by accessing the access control server.

7. The *hardware* network device of claim 1, wherein the access control database is stored remotely on at least one access control server on the public network and access to the access control data in the access control database by the *hardware* network device is performed by accessing the access control server.

8. The *hardware* network device of claim 6, wherein access to the access control data is a subscription service [to] *with* which the *hardware* network device must be registered [with] in order to be allowed access to the access control data.

9. The *hardware* network device of claim 1, wherein:

the request includes a source designation and the resource identifier information *of the request* specifies a destination of the request;

the categorized resource identifier information in the access control data is categorized by associating predetermined destinations to specific categories of content; and the access control processor determines if the [client] *one of the clients* making the request is associated with a category of content which contains a predetermined destination having a portion that is equal to the destination specified in the resource identifier information of the request.

10. The *hardware* network device of claim 9, wherein the portion that is equal to the destination specified in the resource identifier information of the request is a segment of the resource identifier information.

11. The *hardware* network device of claim 9, wherein the resource identifier information *of the request* is an internet protocol address.

12. The *hardware* network device of claim 9, wherein *the* categorized resource identifier information in the access control database is categorized by searching for uncategorized content provided by *the* servers [located on] *in* the public network and presenting the *uncategorized* content [of the data files] to humans for evaluation and categorization *to produce categorized content*, the categorized content being represented in the access control database by an identification of a location of the *categorized* content on *the* servers [of] *in* the public network.

13. The *hardware* network device of claim 12, wherein the uncategorized content provided by the servers [on] *in* the public network is discovered by a network walker process which records new content destinations as they are discovered.

14. The *hardware* network device of claim 1, wherein:

the request includes a source designation and the resource identifier information *of the request* specifies a destination of the request and the at least one access control database includes a group-source database and the access control processor, in determining if the request should be forwarded to the public network, matches the source designation of the request to the group-source database to determine the group of the [client] *one of the clients* making the request.

15. The *hardware* network device of claim 14, wherein:

the at least one access control database further includes a group-category database and the access control processor, in determining if the request should be forwarded to the public network, matches the group of the [client] *one of the clients* making the request to at least one category to determine which categories of content may be accessed by that group.

16. The *hardware* network device of claim 14, wherein:

at least one access control database further includes a category-destination database and the access control processor, in determining if the request should be forwarded to the public network, attempts to match the destination specified in the resource identifier information to at least one resource identifier destination listed within categories in the category-destination database, and if a match is made, the access control processor denies access to the server to which the request is destined.

17. The *hardware* network device of claim 16, wherein the access control processor, in determining if the request should be forwarded to the public network, matches the group of the [client] *one of the clients* making the request to at least one category having an associated block of allowed access times, to determine which categories of content may be accessed by that group and at which times.

18. A method *executing on a first client computer connected to a public network and on an access controller connected to a private network, the method being* for controlling access by clients of [a] *the* private network to data files stored on servers connected in [a] *the* public network, the method comprising the steps of:

at [a] *the first* client computer connected to the public network, *using the first client computer to:*

[searching] *search* for uncategorized data files being stored on servers connected in the public network, the *uncategorized* data files being available on demand;

*store data file information comprising at least a uniform resource locator (URL) for each of the uncategorized data files in at least one initial database;*

*retrieve one or more selected data files from the initial database, at a time after the step of using the first client computer to store data file information in the at least one initial database;*

[presenting] *present* a view of each selected data file in human readable form on the *first* client computer connected to the public network;

[permitting] *permit* a human being to review the contents of each selected data file so presented;

[determining a] *associate, with each selected data file, a determined* content rating for each *selected* data file in response to presenting the contents of the *selected* data file to a human being, the content rating being determined as a result of the human being assigning the *selected* data file to at least one content subject matter category; *and*

[storing] *store* a uniform resource locator (URL) of each *selected* data file together with the associated content subject matter [categories] *category* in a category-destination database;

at an access controller connected to the private network, *using the access controller to:*

[downloading] *download* the category-destination database;

[receiving] *receive* requests from *second* client computers connected to the private network, the requests *from the second client computers* indicating *requested* data files stored on the servers [of] *connected in* the public network;

[analyzing] *analyze* the data in each request *from a client computer of the second client computers* against the data from the category-destination database; and

[determining] *determine* whether to forward the request *from the client computer of the second client computers* to a server of the *servers connected in the* public network for processing, the determination being made based upon the content rating of the requested data file.

19. The method of claim 18, wherein the step of [analyzing] *using the access controller to analyze* the data in each request further comprises the steps of *using the access controller to*:

[examining] *examine* a source of the request against a group-source database to determine a group associated with the client making the request;

[examining] *examine* the group associated with the client making the request against a group-category database to determine the content ratings that the group may access;

[obtaining] *obtain* URL information from the request; and

[determining] *determine* if the URL information has been assigned a content rating that the group may access, and if so, [allowing] *using the access controller to allow* the request, and if not, [denying] *using the access controller to deny* the request.

20. The method of claim 18, further comprising the step of [filtering] *using the access controller to filter* contents of return data sent from servers [on] *connected in* the public network in response to a request which is allowed.

21. The method of claim 18, wherein the URL information is an Internet Protocol (IP) address.

22. The method of claim 18, wherein the URL information is a world wide web page address.

23. The method of claim 18, wherein the URL information is a portion of a world wide web page address.

24. The method of claim 18, wherein the [downloading] *using the access controller to download* is automatically performed at regular intervals.

25. The method of claim 24, wherein the [downloading] *using the access controller to download* is a subscription service to which the access controller must be registered so that the [downloading] *using the access controller to download* can be performed.

26. The method of claim 18, wherein the step of [searching] *using the first client computer to search* for [new] *uncategorized* data files on the public network is performed by a network walker process.

27. The method of claim 19, wherein the group-category database includes at least one group that is associated with different content ratings depending on the time of day of the request.

*28. A hardware network device according to claim 1, the hardware network device comprising one or more processors and one or more memories operable to store program instructions executable by the one or more processors to implement:*

*the first interface, the access control processor, the second interface, and the means for permitting the network administrator of the private network to control the operation of the hardware network device.*

*29. A hardware network device according to claim 28, wherein:*

*the request includes a source designation and the resource identifier information of the request specifies a destination of the request and the at least one access control database includes a group-source database and the access control processor, in determining if the request should be forwarded to the public network, matches the source designation of the request to the group-source database to determine the group of the one of the clients making the request.*

*30. A hardware network device according to claim 29, wherein:*

*the at least one access control database further includes a group-category database and the access control processor, in determining if the request should be forwarded to the public network, matches the group of the one of the clients making the request to at least one category to determine which categories of content may be accessed by that group.*

*31. A hardware network device according to claim 28, wherein the access control database is stored remotely on at least one access control server on the public network and access to the access control data in the access control database by the hardware network device is performed by accessing the access control server.*

*32. A hardware network device according to claim 1, the categorized resource identifier information associated with each data file so categorized being further assigned by, prior to storing the data file information comprising the uniform resource locator for each data file in the first database, determining whether the data file information comprising the uniform resource locator is already stored in either a queue database, the first database or the access control database and, if not, initially storing the data file information comprising the uniform resource locator in the queue database.*

*33. A method according to claim 18, wherein the at least one initial database comprises (i) a queue database for holding the URLs associated with the uncategorized data files and (ii) an uncategorized database, wherein the using the first client computer to retrieve one or more selected data files retrieves such files from the uncategorized database, and wherein the using the first client computer to store data file information further comprises:*

*if the data file information located in the using the first client computer to search for uncategorized data files is not already stored in either the queue database, the uncategorized database, or the category-destination database, then using the first client computer to store the data file information in the queue database.*

*34. A method according to claim 33, further comprising:*

*using the first client computer to obtain further information for the data file information located in the using the first client computer to search for uncategorized data files, the further information including information other than the URL, and using the first client computer to store that information in the uncategorized database.*

* * * * *

UNITED STATES PATENT AND TRADEMARK OFFICE

CERTIFICATE OF CORRECTION

PATENT NO. : RE41,168 E
APPLICATION NO. : 10/965710
DATED : March 23, 2010
INVENTOR(S) : Steven Shannon It is certified that error appears in the above-identified patent and that said Letters Patent is hereby corrected as shown below:

In Column 16, Claim 1, lines 28-29 delete “public” and insert --private--.

Signed and Sealed this
Ninth Day of August, 2011

David J. Kappos

David J. Kappos
*Director of the United States Patent and Trademark Office*